United States Patent [19]

Nadeau et al.

[11] Patent Number: 5,237,761
[45] Date of Patent: Aug. 24, 1993

[54] ROTARY DITCHER HAVING RIPPER BLADES

[75] Inventors: Gilbert M. Nadeau, Fannystelle; Jeff P. Nicolajsen; Russel P. Nicolajsen, both of Sperling, all of Canada

[73] Assignee: Rotary Ditchers Ltd., Winnipeg, Canada

[21] Appl. No.: 708,688

[22] Filed: May 31, 1991

[30] Foreign Application Priority Data

Jun. 5, 1990 [CA] Canada ................................. 2018274

[51] Int. Cl.⁵ ............................ E02F 5/08; E02F 5/14; E02F 5/32
[52] U.S. Cl. ............................................ 37/92; 37/189; 37/906; 172/78; 172/109
[58] Field of Search ....................... 37/91, 92, 93, 109, 37/189, DIG. 19; 172/63, 78, 64, 108, 109

[56] References Cited

U.S. PATENT DOCUMENTS

| 888,327 | 5/1908 | Harris | 172/109 |
|---|---|---|---|
| 1,903,124 | 3/1933 | Miller et al. | 37/DIG. 19 X |
| 3,168,785 | 2/1965 | Davis | 37/92 |
| 3,261,117 | 7/1966 | Shoemaker et al. | 37/92 |
| 3,417,495 | 12/1968 | Barras | 172/108 |
| 3,624,826 | 11/1971 | Rogers | 37/92 |
| 4,976,052 | 12/1990 | Jeane | 37/189 X |

FOREIGN PATENT DOCUMENTS

| 216979 | 12/1957 | Australia | 37/92 |
|---|---|---|---|
| 1092391 | 3/1957 | Fed. Rep. of Germany | 37/92 |
| 589338 | 1/1978 | U.S.S.R. | 37/92 |

OTHER PUBLICATIONS

KeyWay Ditchers of Minnesota, Inc. brochure *The Rotary Ditch Cleaner*.

Primary Examiner—Dennis L. Taylor
Assistant Examiner—Arlen L. Olsen
Attorney, Agent, or Firm—Kinney & Lange

[57] ABSTRACT

A rotary ditcher has a flywheel type rotor carrying impeller blades that pick up and throw soil to the side of the rotor as the rotor is advanced into a body of soil in the direction of its axis of rotation. In advance of the rotor are two ripper blades that loosen the soil to be picked up and discharged by the rotor.

18 Claims, 9 Drawing Sheets

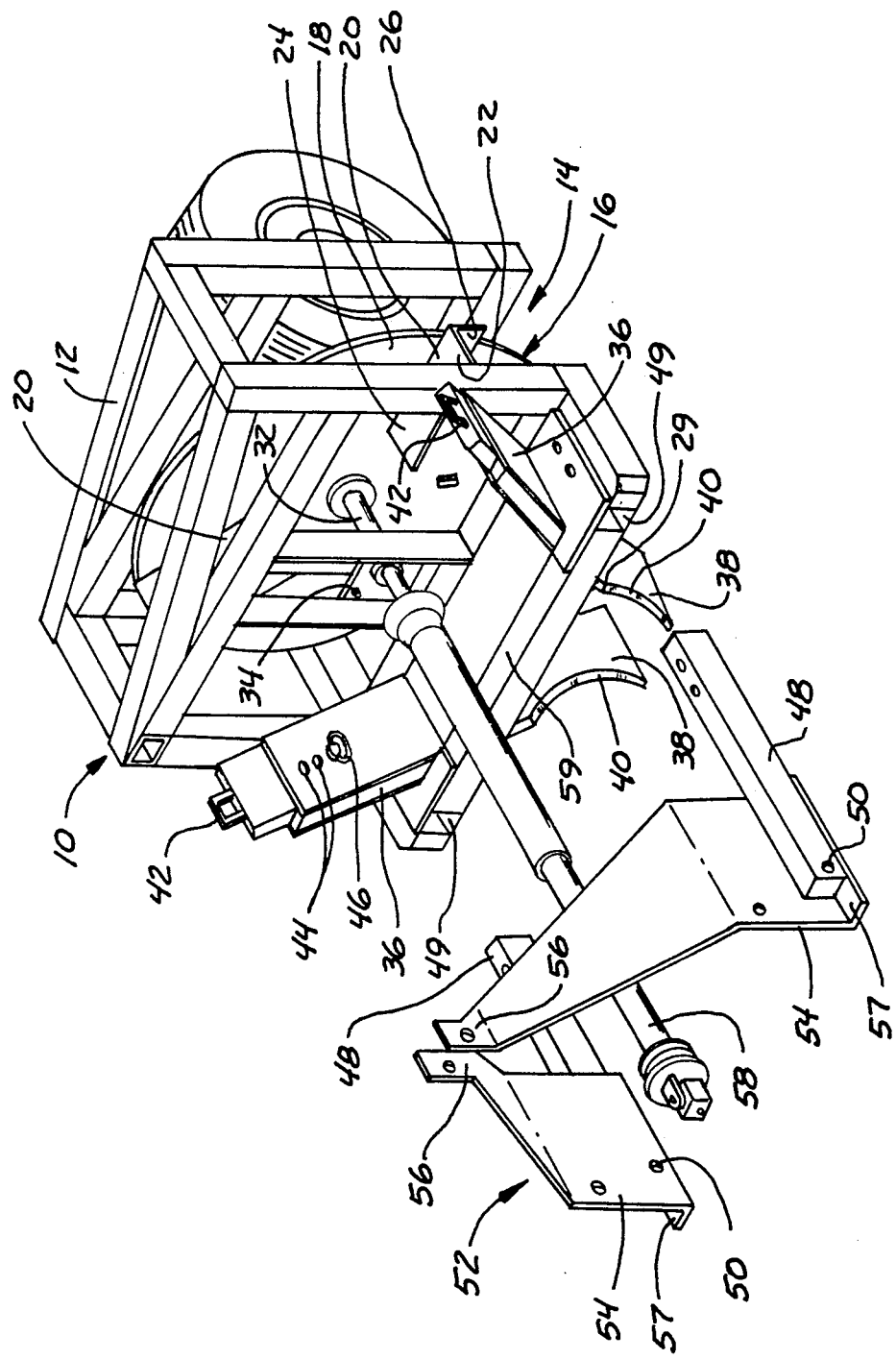

FIG. 11
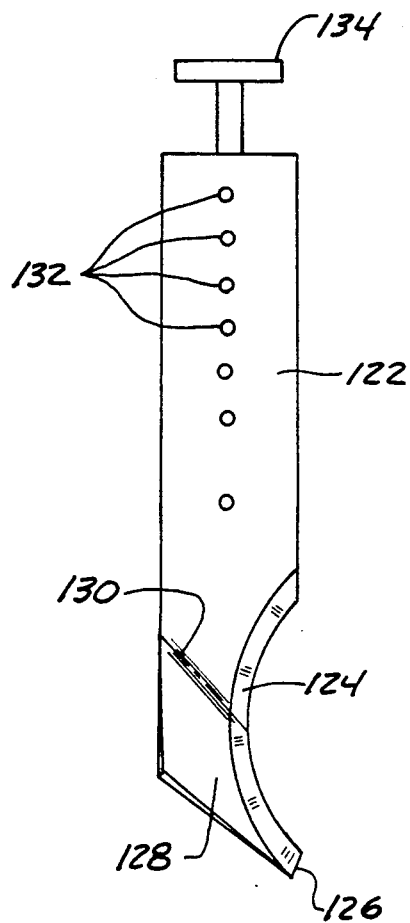
FIG. 10
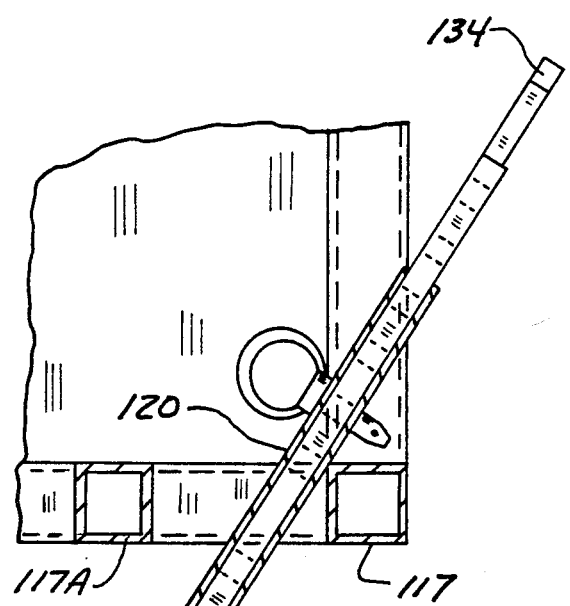
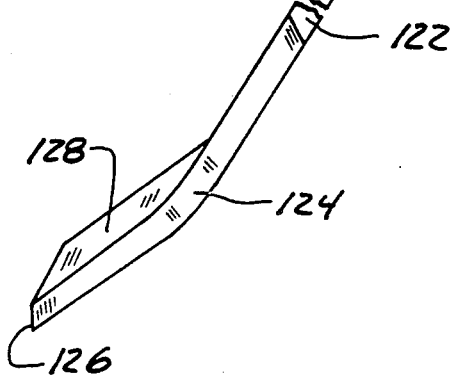

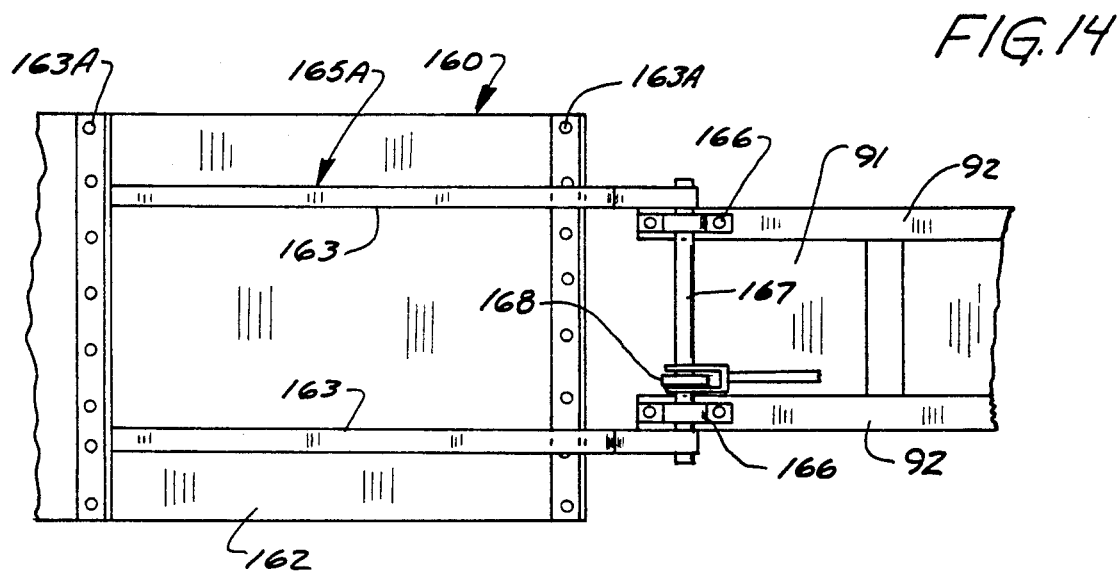

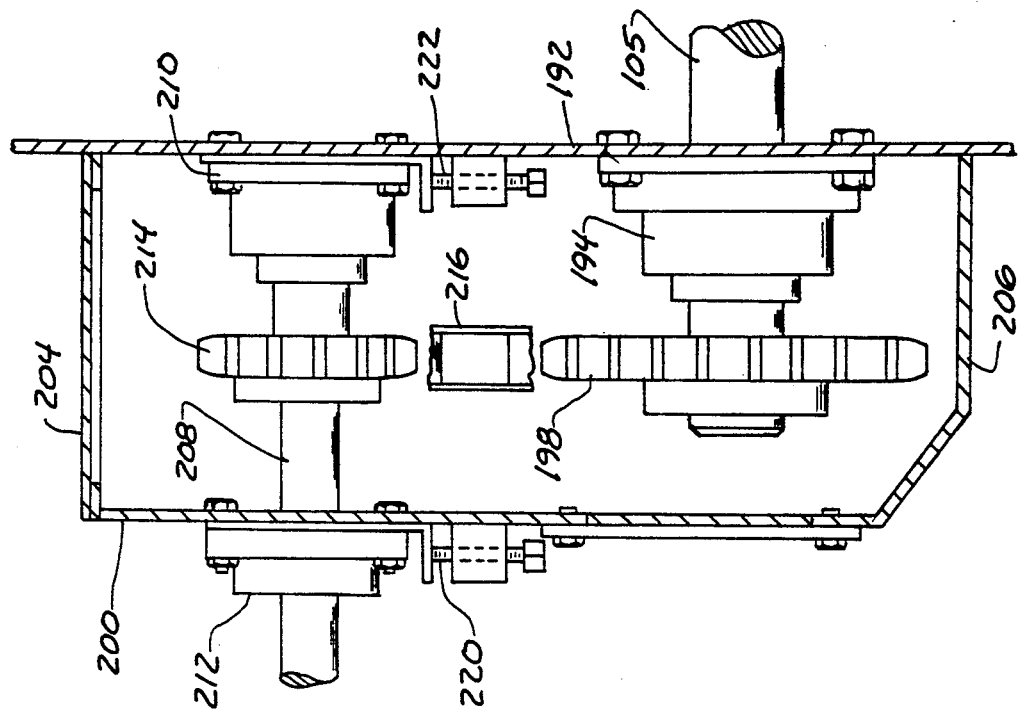
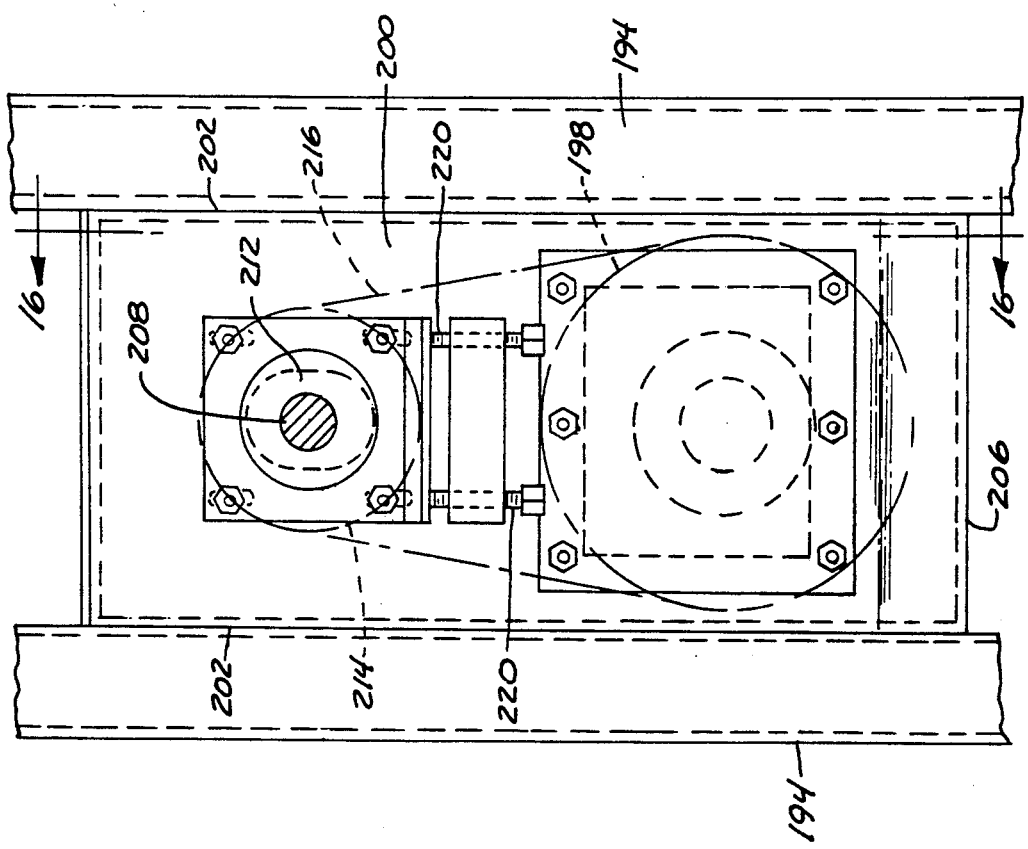

ROTARY DITCHER HAVING RIPPER BLADES

BACKGROUND OF THE INVENTION

The present invention relates to ditchers and more particularly to rotary ditchers for forming drainage ditches.

In a rotary ditcher, impellers carried by a rotor engage the soil to be ditched as the rotor is rotated and scoop the soil from the surrounding surface and throw it centrifugally to the side of the ditch being cut. With ditchers of this type considerable power is required to draw the rotor into the body of the soil being ditched, especially if the soil is heavy or highly compacted, for example in clay soil. The presence of rocks and other hard objects in the soil aggravates this problem and can, in a worst case, cause significant damage to the ditcher.

The present invention provides an improved ditcher that provides improved operation of ditchers of the type.

SUMMARY OF THE INVENTION

According to the present invention there is provided a ditcher adapted to be moved in a longitudinal forward direction over a body of soil to be ditched. The ditcher comprises a frame mounting a rotor rotatable about a longitudinal axis that is preferably driven from a power takeoff of a towing vehicle.

A plurality of impellers or blades are carried by the rotor to sequentially engage the body of soil and propelling soil laterally from the rotor and frame upon rotation of the rotor and forward movement of the frame to form the ditch. Ripper means for engaging and loosening the body of soil below the surface longitudinally forwardly of the rotor may be used. The rippers loosen the soil ahead of the rotor to an appropriate depth so that the rotor functions primarily to throw the already loosened soil to one side of the ditch rather than operating as a digging implement.

The ditcher is preferably drawn by a three-point hitch of a tractor and has a depth control wheel. The frame of the ditcher may be pivotally connected to the hitch so that it can pivot up freely on impact with large objects that cannot be loosened by the rippers.

The impeller may be a single-sided blade with a concave lip along one edge or, in a preferred embodiment, a blade assembly that has a hard surface edge for soil engagement. The impellers are preferably connected to the rotor through the use of bolts, for replacement purposes. In one form, a bolt is closest to the center of rotation and a shear pin is used outwardly of the bolt. With this arrangement, impacts with rocks or other hard objects sufficient to sever the shear pin will cause the impeller or blade to pivot towards the rotor axis to release the object. While continued rotation of the rotor will cause the impeller or blade to swing outwardly, its maximum extent is approximately its operating position so that no undue hazard is caused.

The top of the interior chamber for the impellers may be lined with polyethylene or other low friction material to reduce sticking of dirt to the housing.

BRIEF DESCRIPTION OF THE DRAWINGS

FIG. 2 is a view like FIG. 1 with the covers removed;

FIG. 10 is an enlarged front view illustrating a ripper blade installed on the embodiment of the invention shown in FIG. 6;

FIG. 11 is a plan view of a ripper blade shown in FIG. 10;

FIG. 14 is a top plan view of a portion of the apron shown in FIG. 12 with parts broken away for clarity;

FIG. 15 is a front elevational view of a gear box assembly utilized with the present invention; and FIG. 16 is a sectional view taken on line 16—16 in FIG. 15.

DETAILED DESCRIPTION OF THE PREFERRED EMBODIMENTS

Figure 1:
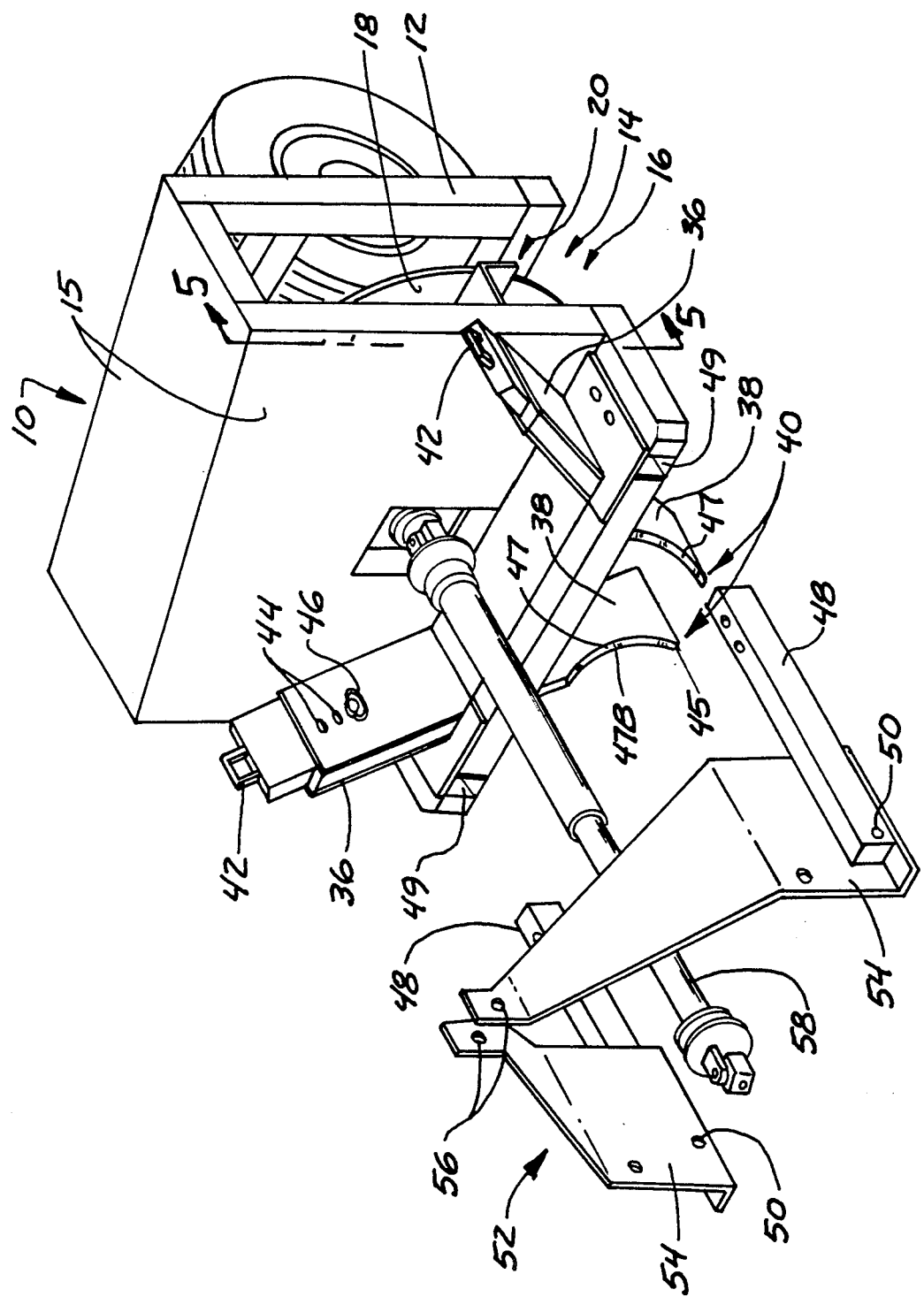
FIG. 1 is an isometric view of one embodiment of the invention.

Referring to the accompanying drawings and especially FIGS. 1 and 2, there is illustrated a ditcher 10 that is built on a frame 12 with an open side 14 for the ejection of soil being ditched. The remainder of the frame is enclosed by cover plates 15 to form a rotor housing.

Figure 4:
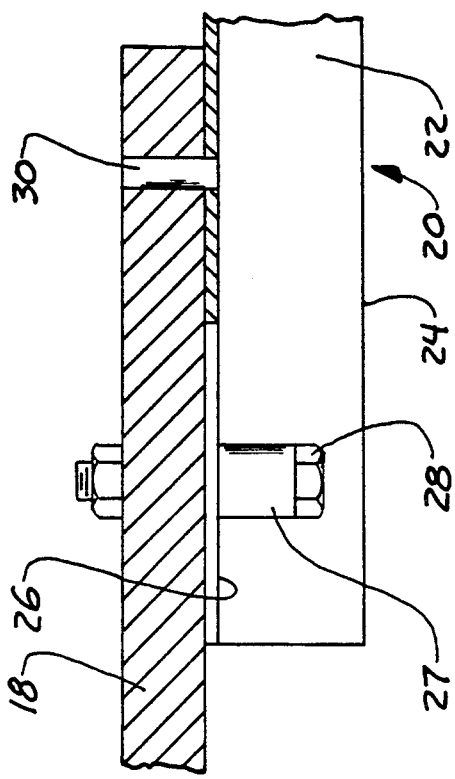
FIG. 4 is a section along line 5—5 of FIG. 1.
Figure 5:
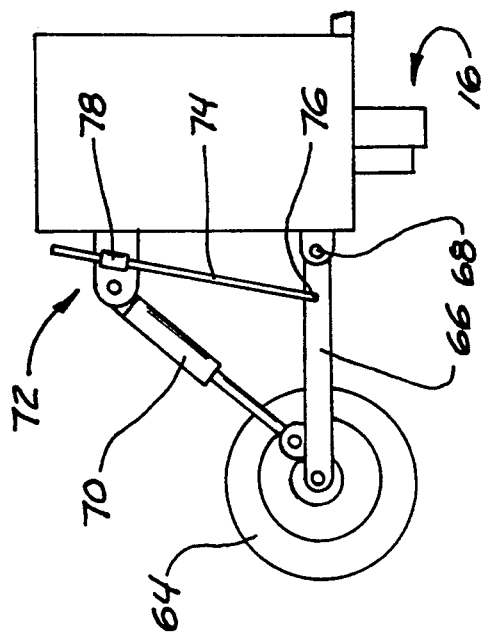
FIG. 5 is a side elevation of a depth control.
Figure 3:
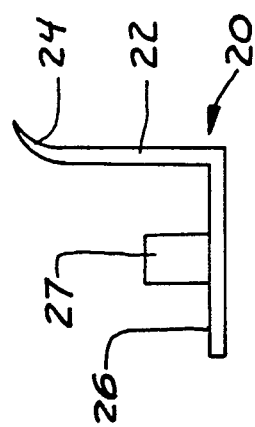
FIG. 3 is an end view of a first form of impeller or blade.

As illustrated most particularly in FIG. 2, the frame encloses a rotor 16 composed of a flywheel type disc 18 extending radially from a central mounting shaft 32. The disc carries three impellers 20 on its leading face. Each impeller includes a radially extending blade 22 with a planar body and a concave lip 24 along its outer edge. The blades are arranged radially on the leading face of the disc 18 and project longitudinally of the ditcher, to the front of the disc. Each impeller also includes a mounting flange 26 lying on the face of the disc 18 and projecting from the blade in a direction opposite the curve of the lip 24. The mounting flange 26 carries a bushing 27 (FIG. 4) perpendicular to the disc 18 and rotating on a mounting bolt 28 that passes through the bushing and the disc. The mounting flange 26 is also fixed to the disc 18 with a shear pin 30 that extends through aligned holes in the flange and the disc. The shear pin 30 is smaller in diameter and of less strength than the bolt 28. It is positioned radially farther from the center of disc 18 so that on impact of the impeller with a hard object, the shear pin will shear and release first, allowing the impeller blade to rotate freely around the bolt 28. A stop 29 on the disc 18 limits the rotation of the respective impellers to protect the mounting shaft 32 of the disc 18. The shaft 32 supported in bearings 34 on the frame 12.

In front of the rotor 16 on the frame 12 are two ripper blade housings 36 fixed to the frame 12. These are rectangular tubular slide housings converging in downward direction. Each of the housings 36 slidably supports a ripper blade 38 with a leading cutting edge 40. The upper end of each blade 38, where it projects from the associate housing 36, is equipped with a handle 42. A series of apertures 44 in the ripper housing 36 may selectively be aligned with a mating aperture in the associated ripper blade and the two sliding parts held together with a pin 46. This provides for the adjustment of the ripper blades in the ripper blade housing so the blades will penetrate the soil. The lower ends of the ripper blades 38 are preferably shaped to provide a lifting action as shown. The lower tips of the ripper blades 38 are shaped to have a point portion 45 that is defined by an inclined and beveled upper surface 47 that is recessed and beveled or sharpened so there is an edge 47B formed by the beveled surface 47. The beveled surface sheds the soil as well. The sharpened edge slides through the soil and lifts and loosens the soil through which the blade moves. The ripper blades 38 are used where the ground is hard packed clay or the like. A more detailed showing is made in FIGS. 10 and 11.

At the leading end of the frame 12 are two beams 48 that fit into respective sockets 49 in the frame 12 and are bolted in place. Each of the beams 48 is pivotally connected by a pivot pin 50 at its leading end to one side of a three-point hitch coupling 52. Each side of the coupling 52 is a plate with a lower section 54 to which the beam 48 is connected, the coupling plates each include an inwardly offset upper section 56. A flange 57 along the bottom edge extends under the beam 48 to limit the pivoting movement of the frame 12 on the hitch coupling.

A power take-off shaft 58 is connected to the front end of the rotor shaft 32 to drive the shaft from the power take-off of a towing vehicle.

To control the depth of cut of the ditcher, a depth control mechanism is mounted on the trailing end of the frame 12. This includes a depth control wheel 64 mounted on a wheel arm 66 pivoted to the frame by a pivot 68. A hydraulic cylinder 70 extends between the frame 12 and the wheel arm 66 to control the vertical position of the wheel 64 with respect to the rotor 16.

A visual depth gauge 72 is mounted on the apparatus to indicate the depth to which the ditcher has been set. This includes a rod 74 mounted on the wheel arm 66 by pivot a 76 and a sleeve 78 on the frame 12 through which the rod 7 slides. The rod 74 is graduated and readings are taken where the rod enters the sleeve 78 to indicate the ditch depth.

Figure 12:
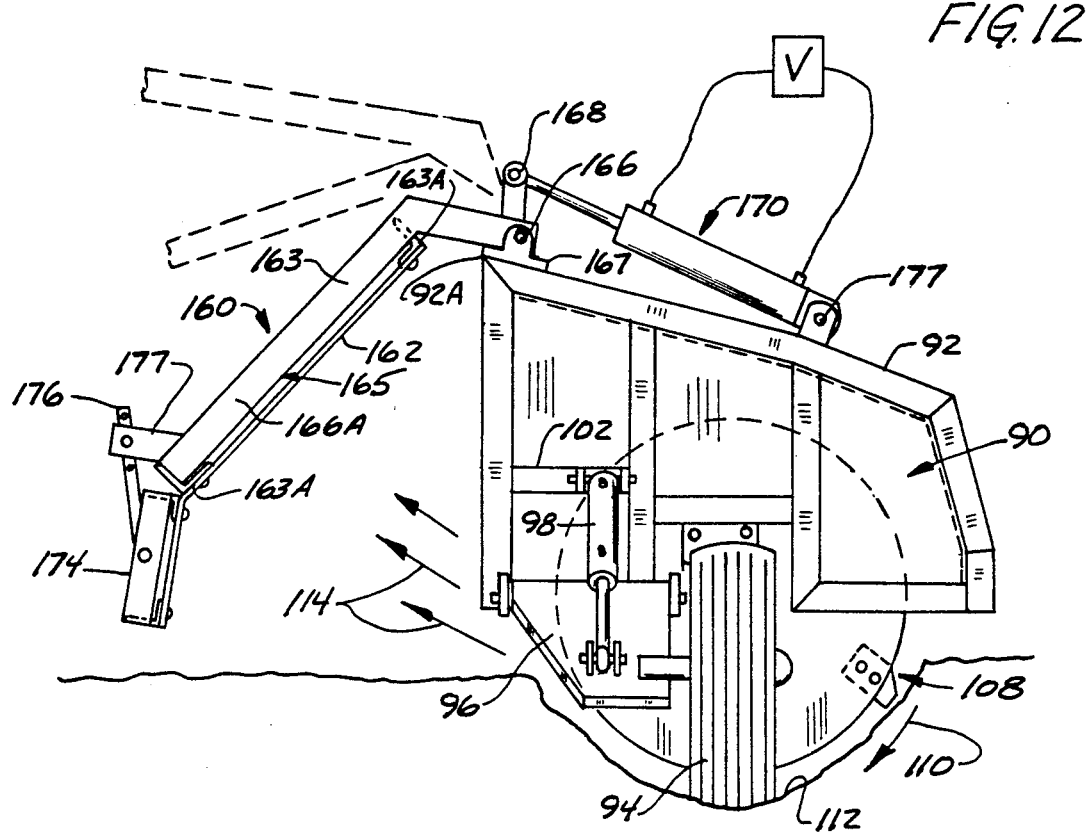
FIG. 12 is a rear view of the embodiment of the invention of FIG. 6 showing an alternate soil deflection apron mounted on the ditcher.
Figure 13:
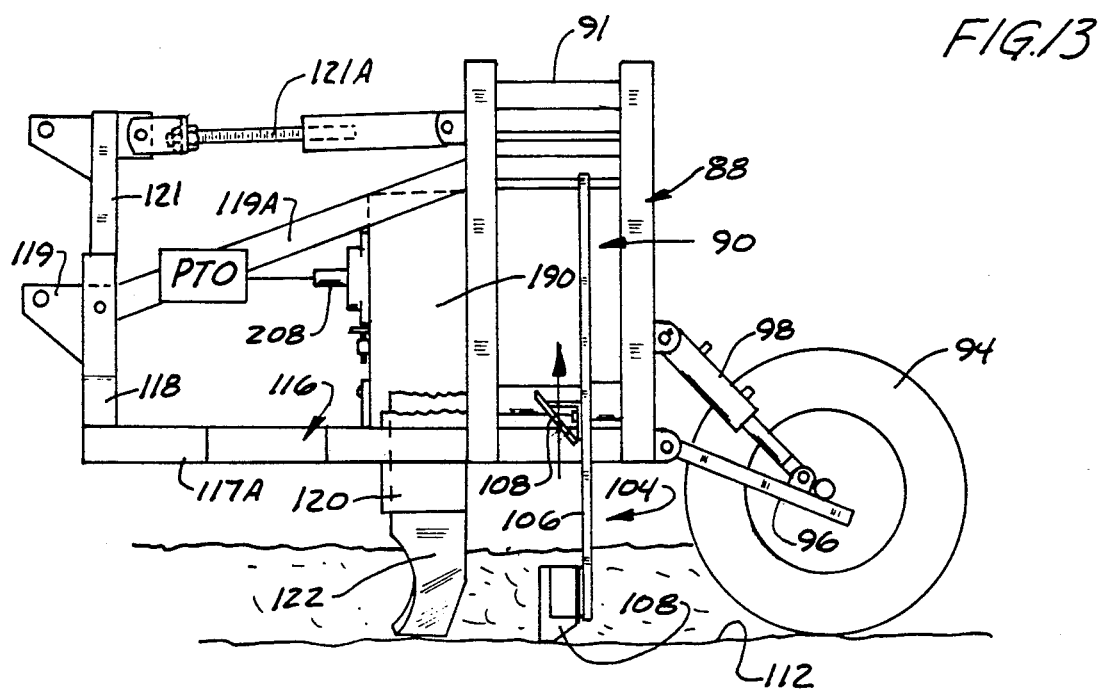
FIG. 13 is a side view of the embodiment of FIG. 6 shown from the discharge side of the machine, but with the apron removed.

In FIGS. 6-16, a modified form of the invention is shown, comprising a frame 88, that has square tubing upright members and top members that support panels to define a rotor housing 90. The housing has an inclined upper wall 91 (see FIG. 9.) A support wheel 4 is mounted onto a pivoting arm 96 that is supported on the flange 88 and which is controlled with a hydraulic cylinder 98. The cylinder 98 has a rod that is mounted as at 100 to the arm 96, and a base which is mounted to a frame work cross-piece 102. The upper wall 91, which follows the contour of the top frame member 92, fits around the rotor assembly 104, which comprises a metal disc or plate 106 having soil cutting blades or impellers 108 extending therefrom. The rotor 104 is suitably mounted on a shaft 105 (see FIG. 13) for driving. The rotor is rotated in direction as indicated by the arrow 110 (FIG. 12) or 146 (FIG. 6) to form a ditch 112 in the ground. The wheel 94 rides in the bottom of the just formed ditch as shown in FIG. 12, and soil will be thrown outwardly as shown by the arrows 114 (FIG. 6) across a substantial distance.

As will be described, a deflector apron for intercepting the soil and forming a levee or ridge is shown in FIG. 12.

Figure 6:
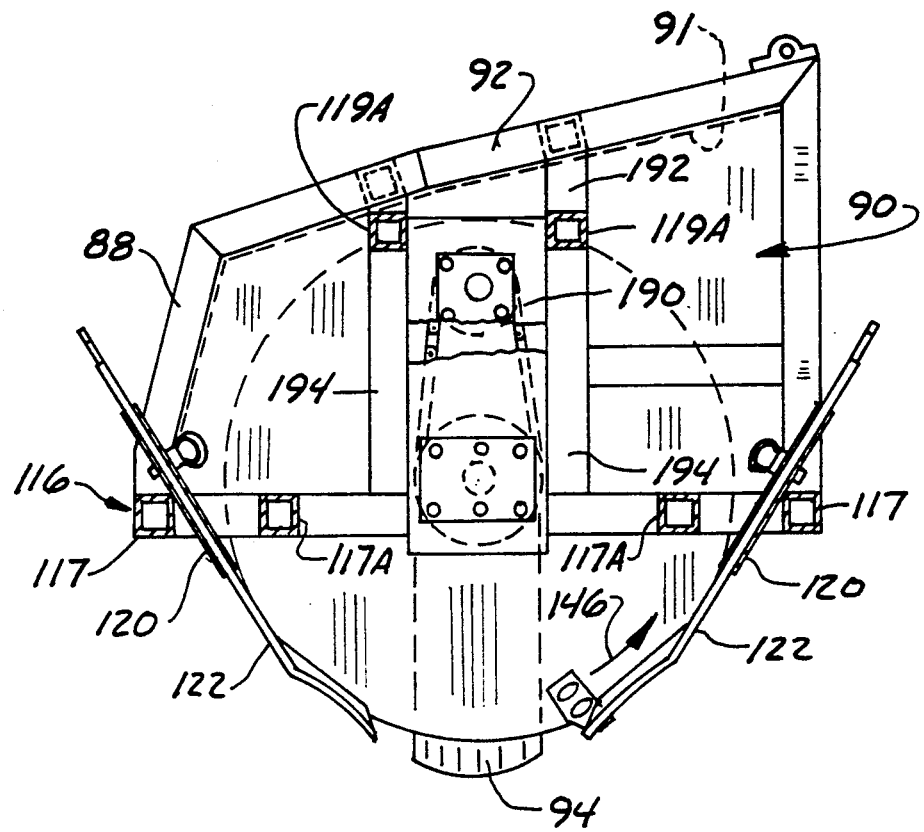
FIG. 6 is a front elevational view of a modified embodiment of the invention with parts removed for sake of clarity.

The support frame 116 which is supported on a forwardly extending three-point hitch, is well known. The hitch can be generally of the type shown in the first form of the invention. The support frame has forwardly extending frame members 117 which mount slide pockets 120 at an angle relative to the horizontal, as shown in FIGS. 6 and 10. The frame members 117 are braced to spaced support tubes 117A that extend forwardly and have uprights 118 that support hitch clevices 119 which attach to a three-point hitch of a tractor. Braces 119A extend back to the housing frame and are welded in place. A three-point hitch mast 121 also is used and is adjustably braced back to the housing frame with a brace 121A.

The slide pockets 120 are welded to the frame members 117, and the pockets 120 mount ripper blades 122 of a modified form. These ripper blades 122 are shown in greater detail in FIGS. 10 and 11, and are shown mounted in FIGS. 6 and 9. The ripper blades 122 have recessed and beveled cutting edges indicated at 124. The recess forms a penetrating and cutting point 126 at the lower end. The lower end portion indicated at 128 of each is bent along a bend line 130, so that the inner end tilts inwardly, (right and left-hand units are used) and this provides for the configuration shown in FIGS. 6 and 10. The lower ends of the upper blades run below the ground at a level about equal to the blades on the rotor and provide a loosening and lifting action for soil that is being worked by the ripper blades.

Each of the ripper blades 122 has a series of holes 132 for providing adjustment with a mating hole in the slide pockets, so that the ripped blades can be pinned in a desired position. A lift handle 134 is provided on the ripper blades. The bends in the ripper blades aid in insuring that the ground is loosened adequately before the rotor passes over the ground.

Figure 7:
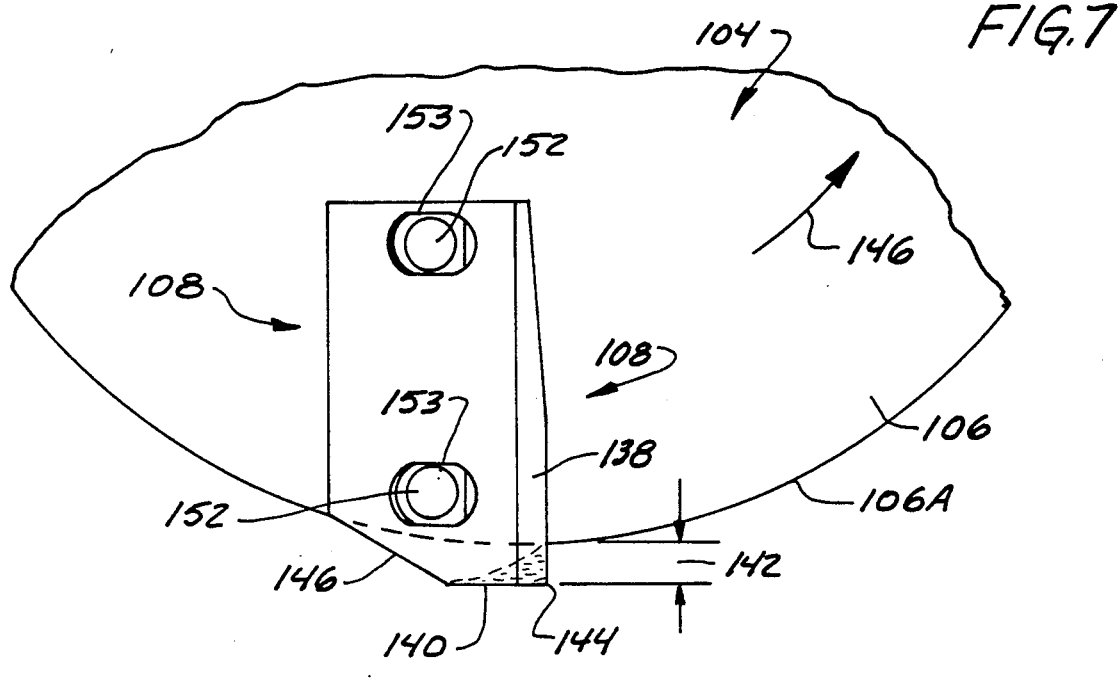
FIG. 7 is a fragmentary enlarged view of a portion of the rotor of the modified form of the invention of FIG. 6.
Figure 8:
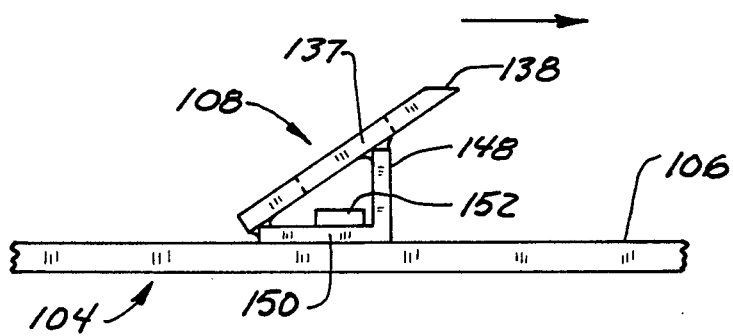
FIG. 8 is an end view of a cutting blade and a portion of the rotor shown in FIG. 7.

In the second form of the invention, the rotor assembly 104 is made with different cutting blades or impellers than shown in the first form. As shown in FIGS. 7 and 8, there are a selected number (3 or more) of cutting blades indicated generally at 108, and these are formed with blades 137 that have a beveled leading edge indicated at 138. The working portions of the beveled edges 138 that extend beyond the rotor disc are hard surfaced. The lower edge 140 of each cutting blade 137 is also hard surfaced. The portions of the blades 137 that project outwardly from the peripheral edge 106A of the rotor disc 106, as indicated by the dimension 142 are thus hardened. The blades 108 are made to provide a leading cutting corner 144 that engages the ground, and as the rotor disc 106 is rotated in the direction of arrow indicated by 146, (FIG. 6, which is a front view), it will engage the surface of the ground and will cause the dirt that is loosened by the edge 138 that is protruding forwardly of the disc 106 to be engaged by a leading surface 148 of a blade support angle 150. The blade support angle 150 holds the blade 137 at an incline relative to the plane of the rotor disc, so that the edge 138 is spaced from the face of the rotor disc a desired distance. The support angle 150 and blade 137 formed as assemblies 108 can be mounted to the rotor disc with suitable strength bolts 152 that are accessible from slots 153 in the blade 137.

The blade assemblies 108 are thus replaceable, and the blades 137 have a cutting edge 138 that is hardened in the portion that protrudes beyond the peripheral edge 106A of the rotor disc 106. The protrusion of blades 137 is a sufficient distance to pick up the soil, and to cause it to be impelled outwardly as the rotor 104 rotates. The soil will be discharged out through the open lateral side of the frame, as shown.

In FIG. 12, a rear view of the frame assembly 88 is illustrated. The soil that is projected out will be scattered across the ground surface unless an optional apron indicated generally at 160 is provided. The apron 160 can be raised to a dotted line position, so that the soil will clear the apron 160 completely, but when the apron 160 is in its solid line position, the soil striking the apron will engage a panel 162 that is supported on frame members 163 and cross members 163A, and it will be dropped down onto the ground to make levies or dikes alongside the ditch being formed. The apron 160 includes a main frame section 165 that has a mounting shaft 166 fixed thereon mounted rotatably in bearings 167, or in other suitable supports, that are mounted onto the top frame members 92 at the top corner 92A. The shaft 166 has a suitable actuator arm 168 fixed thereon which is operated with a hydraulic actuator 170 that has its base end connected as at 172 to the frame 88, and its rod end connected to the outer end of the arm 168.

By controlling the hydraulic cylinder 170 through a suitable valve and pump arrangement commonly found on tractors, the angular position of the apron 160 can be changed, as desired. The apron has a lower adjustable section 174 which can be changed in angle relative to the upper section 165 for the upper portion by adjusting suitable straps 176 on the lower portion that attach to brackets 177 that are fixed to the frame member 165A of upper or main section 165.

A suitable hinge can be provided between the two frame sections 165 and 174, or if the panel 162 is flexible material, such as heavy duty polyethylene or other low friction material, the panel will hinge sufficiently for supporting the lower adjustable apron section 174 in its position to form a smooth levee.

The adjustment strap 176 can be changed in position using adjustment holes to change the angle of the lower adjustable section 174 relative to the main frame section 165.

Figure 9:
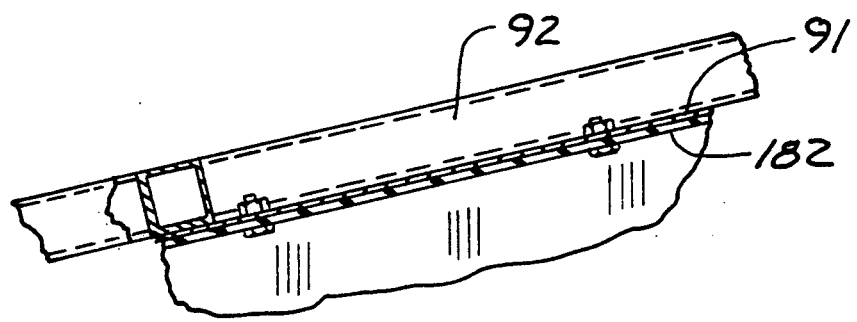
FIG. 9 is a fragmentary front view illustrating a top wall and a lining therefor for the embodiment of the invention shown in FIG. 6.

Also, in order to provide the ability to work in a wide variety of soils, the inner surface of the rotor housing 90, and, specifically, the top wall 91, as shown in FIG. 9, can be lined with a suitable low friction plastic material 182 such as a polyethylene, to permit the soil to drop off and more easily reduce sticking to the surface as the unit is working.

In operation, the ditcher is drawn across the soil surface to be ditched, with the ripper blades penetrating and loosening the soil just below and inside the profile to be cut by the rotor. The rotor drives the impeller or blades through the loosened soil and throws the soil to one side of the ditch. If no apron is used, the soil is thrown a considerable distance (in the range of 150 or more feet) and is scattered across such a width to prevent the buildup of a ridge along the side of the ditch. The impeller in a preferred form has a diameter of about 42 inches and at 500-550 rpm, the tip speed is sufficient to throw the soil laterally and spread it without ridges building up. Forward speeds are relatively low, for example, in the range of one mile per hour. The apron attachment can be used for building levees or dikes alongside the ditch and controlled to achieve the proper shape. The rear wheel provides precise depth and the three-point hitch will permit movement up and down to follow the ground.

In order to provide for different power take-off speeds, (standards are 1000 rpm and 540 rpm), a chain drive box is provided. This box is indicated at 190 and is fixed to and between the front vertical frame members 194. The front panel indicated at 192 of the rotor housing has a bearing 194 mounted thereon, on the outside surface, which, in turn, mounts the rotor shaft 105 for the rotor. A forward end of shaft 196 protrudes from the bearing and has a first sprocket 198 mounted thereon. The rear of the rotor shaft 196 is mounted in a bearing attached to a rear panel 193 of the rotor housing.

The chain box comprises chain box front wall 200, and side walls 202 which are spaced apart, and top and bottom walls 204 and 206, respectively. The chain box, in turn, rotatably mounts a shaft 208 that is housed in a bearing 210 that is attached to the rotor housing front panel 192, and which is adjustable in vertical direction by having slots in the panel 192. The front wall 200 of the chain box also has a bearing 212 mounted thereon which is adjustable in vertical direction with suitable slots. The shaft 208 is mounted in bearings 210 and 212, and carries a drive sprocket 214 thereon, which aligns with the sprocket 198. A chain 216 is used between these sprockets.

The shaft 208 is used for mounting a conventional power take-off shaft from the tractor mounting the ditcher, and with 1000 rpm takeoff, a speed reduction is used between the sprockets 214 and 198 to bring the speed of rotor shaft 196 which drives the rotor to within the range of 500-550 rpm.

This heavy duty chain box has adjustment screws indicated at 220 and 222 threaded through support blocks fixed to the respective wall and panel to bear against bearing plates to provide for tightening the chain 216 to the desired level. The bearings 210 and 212 can then be clamped down with bolts in the provided slots after the adjustment using the screws 220 and 222 has been made. The sprockets can be made the selected size is a different speed of the rotor is desired or if the tractor power take-off is a different rated speed.

Although the present invention has been described with reference to preferred embodiments, workers skilled in the art will recognize that changes may be made in form and detail without departing from the spirit and scope of the invention.

We claim:

1. A ditcher adapted to be moved in a longitudinal direction over a body of soil to form a ditch, said ditcher comprising:
   a frame adapted to be connected to a mobile power member;
   a rotor rotatably mounted to the frame about a longitudinal axis fore and aft axis;
   said rotor comprising a disc extending generally perpendicular to the longitudinal axis;
   a plurality of rotor blades fixed to the disc and having portions extending outwardly beyond a periphery of the disc;
   means for adjusting the depth of the frame relative to the body of soil comprising a wheel arm pivotally mounted to the frame at the rear side thereof, a wheel mounted on an outer end of said wheel arm, and a hydraulic actuator for moving the wheel arm about its pivot to change the relative position of the wheel and the frame, said wheel being mounted to trail the frame and ride in the ditch being formed by the rotor; and at least one ripper blade mounted on the frame forwardly of the rotor with respect to the direction of movement to loosen soil ahead of the rotor, said ripper blade comprising a rigid blade having a leading point, and said point having a bevel edge that inclines upwardly from near a lower end of the ripper blade to cause a lifting action to the soil as the ripper blade is moved through the soil, and said rotor being rotated at a speed to cause the soil removed by the rotor blades to be thrown laterally of the frame.

2. The ditcher as specified in claim 1 and an adjustable apron pivotally mounted on the frame adjacent a lateral side where soil is thrown from the ditcher, said apron being adjustable to intercept thrown soil and deflect the soil downwardly adjacent to the ditch being formed.

3. The ditcher of claim 1 wherein the frame has walls thereon forming a rotor housing, including a top wall, and a lining of low friction material on an inner surface of the top wall to reduce the likelihood of soil adhering to the top wall.

4. A ditcher adapted to be propelled in longitudinal forward direction over a body of soil to be ditched, said ditcher comprising:

a rotor disc having a periphery and being rotatable about a longitudinal axis;

a plurality of generally radial impeller blades carried by the rotor disc and having portions projecting being the periphery of the rotor disc for sequentially engaging the body of soil and propelling soil laterally from the rotor disc upon rotation of the rotor disc, each blade comprising a substantially planar body and a concave lip along an edge thereof spaced from the rotor disc;

each blade being secured to the rotor disc by a pivot bolt and a shear pin, the shear pin being located farther from the longitudinal axis of the rotor disc than the pivot bolt; and means for adjusting the depth of the impeller blades relative to the body of soil.

5. A ditcher according to claim 4 and a hitch comprising a three-point hitch coupling, and including pivot means connecting the hitch coupling to the ditcher for free pivotal movement of the ditcher with respect to the hitch coupling about a lateral axis.

6. A ditcher according to claim 4 including a rotor disc shaft for the rotor, a second shaft spaced from the rotor shaft and mounted on the ditcher, a chain and sprocket drive for effecting a desired speed ratio coupled between the rotor shaft and the second shaft, power take-off means connected to the second shaft for driving the rotor shaft from a power take-off of a towing vehicle through the chain and sprocket drive.

7. A ditcher according to claim 4 wherein the means for adjusting the depth comprises a depth control wheel mounted on the ditches and trailing the rotor.

8. A ditcher according to claim 7 wherein the means for adjusting the depth includes a wheel arm pivotally mounted on the ditcher and extending rearwardly therefrom, the wheel arm and carrying the depth control wheel thereon, and hydraulically actuated means for pivoting the wheel arm with respect to the ditcher.

9. A ditcher according to claim 8 including a depth gauge displaying the position of the depth control wheel with respect to the rotor.

10. The ditcher of claim 4, further comprising an adjustable apron pivotally mounted on the ditcher adjacent a lateral side where soil is propelled from the ditcher, the apron being adjustable relative to the rotor disc to intercept soil propelled by the rotor disc and deflect the soil downwardly adjacent to the ditch being formed.

11. The ditcher as specified in claim 10 wherein the apron has at least two sections, a first section being pivotally mounted to the frame, and a second section pivotally mounted to an outer end of the first section and angularly adjustable relative thereto.

12. A ditcher adapted to be propelled in longitudinal forward direction over a body of soil to be ditched, said ditcher comprising:

a frame having a wall thereon forming a rotor housing including a top wall, and a lining of low friction material on an inner surface of the top wall;

a rotor rotatable about a longitudinal axis on the frame and at least partially in the housing;

a plurality of generally radial impeller means carried by the rotor for sequentially engaging the body of soil and propelling soil laterally from the rotor upon rotation of the rotor, the propelled soil also being retained in a path of movement by the housing, the low friction material lining reducing the likelihood of soil adhering to the top wall;

means for adjusting the depth of the impeller means relative to the body of soil; and at least one ripper for engaging and loosening the body of soil longitudinally forwardly of the rotor, the ripper entering into the soil and being positioned to loosen soil in the path subsequently cut by the rotor.

13. A ditcher according the claim 12 wherein the rotor comprises a disc, and the impeller means comprises a plurality of spaced-apart blades having portions projecting beyond a periphery of the disc.

14. A ditcher according to claim 13 wherein the spaced-apart blades each comprise a flat blade member having a beveled leading edge, and the flat blade member being supported with the beveled leading edge spaced from a face of said rotor disc and being angled back toward the rotor disc.

15. A ditcher according to claim 14 wherein at least the leading edge and an outer end edge of the portion of the flat blade member projecting beyond the periphery of the disc are hard surfaced.

16. A ditcher according to claim 12 wherein the ripper comprises two ripper blades converging downwardly.

17. A ditcher according to claim 16 wherein the ripper blades have concave beveled leading edge adjacent lower end portions, wherein the lower end portions are bent toward a center line of the ditcher.

18. A ditcher according to claim 16 including means for adjusting the vertical portion of the ripper blades on the frame.

* * * * *

UNITED STATES PATENT AND TRADEMARK OFFICE
CERTIFICATE OF CORRECTION

PATENT NO. : 5,237,761

DATED : August 24, 1993

INVENTOR(S) : GILBERT M. NADEAU, JEFF P. NICOLAJSEN, RUSSEL P. NICOLAJSEN

It is certified that error appears in the above-identified patent and that said Letters Patent is hereby corrected as shown below:

Col. 7, line 63, delete "ditches", insert --ditcher--

Col. 8, line 60, delete "edge", insert --edges--

Col. 8, line 61, before "wherein", insert --and--

Col. 8, line 64, delete "portion", insert --position--

Signed and Sealed this

Fifth Day of April, 1994

*Attest:*

BRUCE LEHMAN

*Attesting Officer*        *Commissioner of Patents and Trademarks*